United States Patent
Clark et al.

(10) Patent No.: US 9,846,011 B1
(45) Date of Patent: Dec. 19, 2017

(54) MOTION ANALYSIS UNIT

(71) Applicant: Raytheon Company, Waltham, MA (US)

(72) Inventors: Alan Clark, Tucson, AZ (US); Aaron C. Lattimore, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/331,157

(22) Filed: Oct. 21, 2016

(51) Int. Cl.
    *G01C 23/00* (2006.01)
    *F41G 7/00* (2006.01)
    *F41G 9/00* (2006.01)

(52) U.S. Cl.
    CPC ............... *F41G 7/001* (2013.01); *F41G 9/00* (2013.01)

(58) Field of Classification Search
    CPC .................................. F41G 7/001; F41G 9/00
    See application file for complete search history.

(56) References Cited

U.S. PATENT DOCUMENTS

| | | | |
|---|---|---|---|
| 5,396,284 A | 3/1995 | Freeman | |
| 6,985,172 B1 | 1/2006 | Rigney et al. | |
| 8,229,226 B2 | 7/2012 | Chuang et al. | |
| 2010/0209886 A1* | 8/2010 | Lin | G09B 19/167 434/65 |
| 2010/0209891 A1* | 8/2010 | Lin | G09B 19/167 434/66 |

* cited by examiner

*Primary Examiner* — Adam Alharbi
(74) *Attorney, Agent, or Firm* — Schwegman Lundberg & Woessner, P.A.

(57) ABSTRACT

A motion analysis system includes an acceleration measuring device, an acceleration processor, a velocity processor, a distance processor, a peak velocity processor, a profile correlation processor, and a vehicle action processor. The system determines a time for an initiation of an action for a vehicle by determining that a distance traveled by the vehicle is greater than a safe separation distance and that a peak velocity is greater than a minimum velocity. The system initiates the action for the vehicle based on the verified position of the vehicle and the confirmed profile data as determined by the profile correlation processor, and based on the determination that the distance traveled by the vehicle is greater than the safe separation distance and that the peak velocity is greater than the minimum velocity as determined by the vehicle action processor.

19 Claims, 5 Drawing Sheets

MOTION ANALYSIS UNIT

GOVERNMENT RIGHTS

This invention was made with United States Government support under Contract number N00024-13-C-5403 with the Department of the Navy. The United States Government has certain rights in this invention.

TECHNICAL FIELD

The present disclosure relates to a motion analysis unit.

BACKGROUND

As requirements for missile technology evolve, there is a growing need for enhanced sensing of rocket motor performance. Precise confirmation of flight profile data is needed in order to accurately and independently determine distances and velocities attained as well as time in flight to precisely determine if and when events such as a stage separation, a missile destruct, or a warhead function are executed. In addition, safety certification authorities recommend eliminating distributed safety systems (which currently require additional devices, cabling, and connectors) in new or updated weapons.

DETAILED DESCRIPTION

Figure 1:
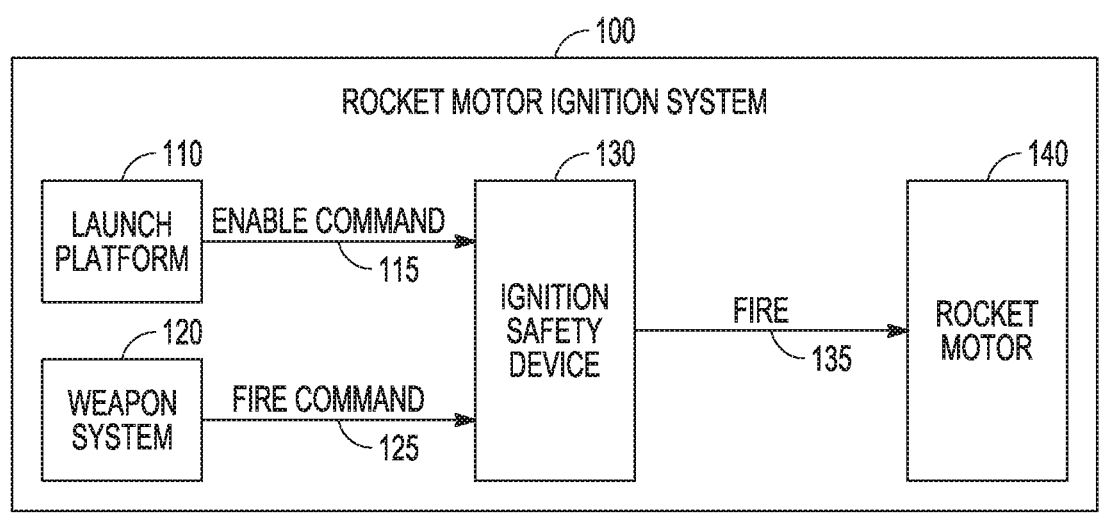
FIG. 1 is a block diagram of a rocket motor ignition system.

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

An embodiment provides an accurate environment detection method for rocket motor performance, and the detection of first motion, safe separation distance having been reached, and rocket motor cut-off deceleration. The embodiment includes multiple independent circuits that are used to enable an integrated safety feature, an enable circuit, a measurement circuit that contains a distance measurement circuit, and a profile measurement circuit with an electronic timer and first motion detect. A distance measurement subsystem is used to determine when the vehicle, rocket, or other weapon has achieved a safe separation distance. Algorithms are implemented in an anti-fuse field programmable gate array (FPGA), which receives sampled data from an analog accelerometer. An embodiment detects the initial launch acceleration and will latch when the rocket motor starts to burn out or reduce acceleration. The sensor outputs are monitored in an autonomous validation circuit for proper operation and error detection. If the data are in error, the entire device will go into a fail-safe state. The device will signal detected events including but not limited to weapon first motion, motor profile verification, safe separation distance detection, and rocket motor burnout.

An embodiment integrates several subsystems into a single unit, providing signals for key events, and eliminating the need for separate circuit interrupters. Specifically, outputs from several acceleration channels are combined in a unique manner. Two longitudinal axes (z axes) are in the line of flight of the weapon or vehicle. A low frequency z axis accelerometer/sensor encompasses the expected range of accelerations and a high frequency z axis accelerometer/sensor covers any anomalies, such as an ejection. The low frequency z axis accelerometer/sensor is kept close to expected values to maintain accuracy (the two z axis channels should correlate and provide accuracy). Lateral accelerometers/sensors x and y are used to detect errors. To determine velocity and distance from the acceleration data, bit shifts instead of division operations are executed to implement a rectangular integration.

An embodiment is a new measurement system that is more accurate than previous devices. Redundancy in power, resets, and clocks dynamically compensates for launch angle, ship roll, and environment movement prior to measurement start, among other things. The system accurately determines first motion (threshold programmable), and determines a programmed distance (also programmable) while verifying a proper thrust profile. The system also includes motor profile verification for performance.

In particular, an embodiment includes methods, systems, and computer program products for analyzing the motion of a vehicle, for example a missile or rocket, and determining what actions to take and when to take such actions based on that analysis. The methods, systems, and computer program products first detect an initial motion of a vehicle using data received from four accelerometers (two longitudinal accelerometers and two lateral accelerometers). The initial motion serves as a baseline. The methods, systems, and computer program products calculate a velocity of the vehicle by adding to a previously-computed velocity an average of a current acceleration and a previously-measured acceleration, and then calculate a distance traveled by the vehicle by adding to a previously-computed distance an average of a current velocity and a previously-computed velocity. Thereafter, the methods, systems, and computer program products determine a peak velocity of the vehicle, verify a position of the vehicle using a motion profile database, and confirm data in the motion profile database. Here, the methods, systems, and computer program products are looking for the vehicle to be at certain places at certain times. The methods, systems, and computer program products then determine a time for an initiation of an action for the vehicle by determining that the distance traveled by the vehicle is greater than a safe separation distance and that the peak velocity is greater than a minimum velocity threshold. Finally, the methods, systems, and computer program products initiate the action for the vehicle based on the verified position of the vehicle, the confirmed profile data, the determination that the distance traveled by the vehicle is greater than the safe separation distance, and the determination that the peak velocity is greater than the minimum velocity. Further details of these methods, systems, and computer program products are discussed herein.

The methods, systems, and computer program products increase the accuracy of an initiation of a vehicular action by approximately 20% of the measured distance and/or velocity to less than 2% of the measured distance and/or velocity. In order to meet requirements to activate, system margins are decreasing and need to be measured with precision previously not possible. The device needs to be precise enough to identify or discriminate features in the motor burn but sense the acceleration profile. The methods, systems, and computer program products also compensate for launch angle and periodic motion, among other things. In this compensation, the methods, systems, and computer program products determine environment movement (e.g., of a launch platform) prior to the start of (acceleration) measurements. The methods, systems, and computer program products further determine in real time key parameters related to motion and verify a motion profile.

Additionally, the methods, systems, and computer program products sense acceleration of complex profiles in order to make vehicular launch and/or ejection decisions and validate rocket motor performance through correlation with an expected profile. The methods, systems, and computer program products are implemented via multiple independent circuits, which enable a safety subsystem. Sensor (accelerometer) outputs are monitored in an autonomous validation circuit to verify proper orientation of a vehicle and to detect errors. If errors are detected, the methods, systems, and computer program products go into fail-safe mode. The methods, systems, and computer program products signal detected events such as first motion of a vehicle, a verification of a motor/motion profile, a safe separation distance, and a burnout of a vehicle motor. The methods, systems, and computer program products integrate several subsystems into a single unit and provide signals for key events, thereby eliminating a need for separate circuit interrupters.

FIG. 1 illustrates a vehicle or rocket motor ignition system 100. The system 100 includes both a safety device and parts of a weapon system that contribute to vehicle/rocket firing. Specifically, the system 100 includes a launch platform 110 and the weapon system 120. The launch platform 110 provides an enable command 115 to an ignition safety device 130, and the weapon system 120 provides a fire command 125 to the ignition safety device 130. Upon reception of the fire command 125 by the ignition safety device 130, a fire signal 135 is transmitted to the motor 140, resulting in firing of the motor and the initiation of the vehicular/rocket action.

Figure 2:
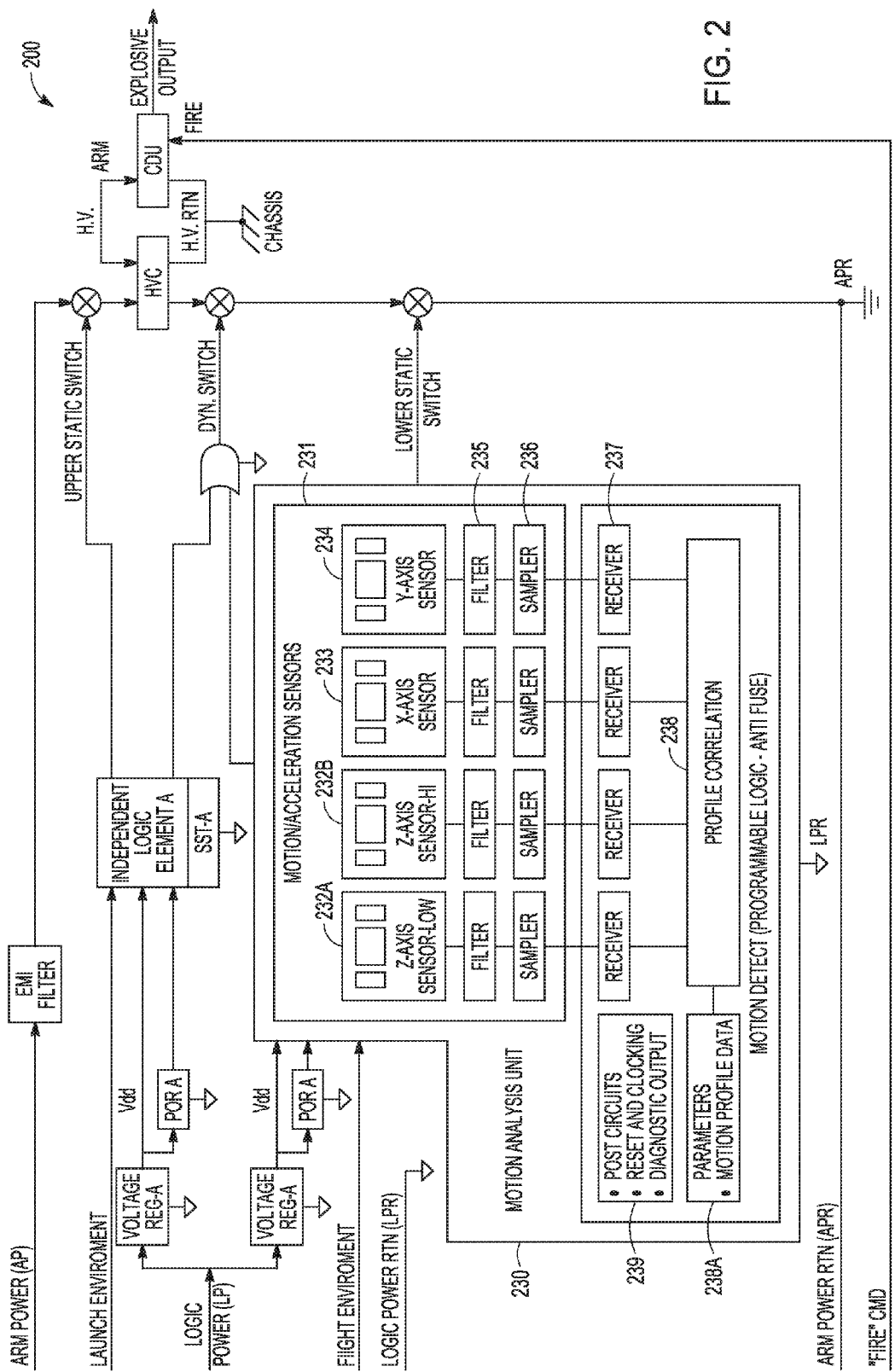
FIG. 2 is a block diagram of a motion analysis unit.

FIG. 2 is a block diagram of a motion analysis system 200. In general it depicts a representative system that will use a motion analysis unit. It is incorporated as one element in a classic ignition safety ignition design. Block 220 shows an independent logic element that is a coarse measurement required by safety certification authorities and is used to add safety to prevent false triggering from the precision measurement circuit. The motion analysis system 200 includes a motion analysis unit 230. The motion analysis unit 230 includes motion or acceleration sensors 231. The acceleration sensors 231 include two z-axis or longitudinal sensors 232A and 232B, a first lateral or x-axis sensor 233, and a second lateral or y-axis sensor 234. The 232A longitudinal sensor is a low sensor, and the 232B sensor is a high sensor. As noted above, the low sensor 232A encompasses the expected range of accelerations and the high sensor 232B covers any anomalies, such as an ejection. The output of each acceleration sensor is fed into a low pass filter 235. The output of the filter 235 is fed into a sampler that is used to convert an analog voltage from the filter into a digital word that is processed by the algorithms implemented in the FPGA sensor 236. The output of the sensor 236 is received by a receiver 237, which provides input to a profile correlation module 238, which further receives parameters from a motion profile database 238A. As explained further herein, the profile correlation module 238 will search acceleration data for key features that will validate that the acceleration for the particular application. The motion analysis unit 230 further includes a module 239 that includes POST circuits, reset and clocking circuitry, and provides diagnostic output.

Figure 4A:
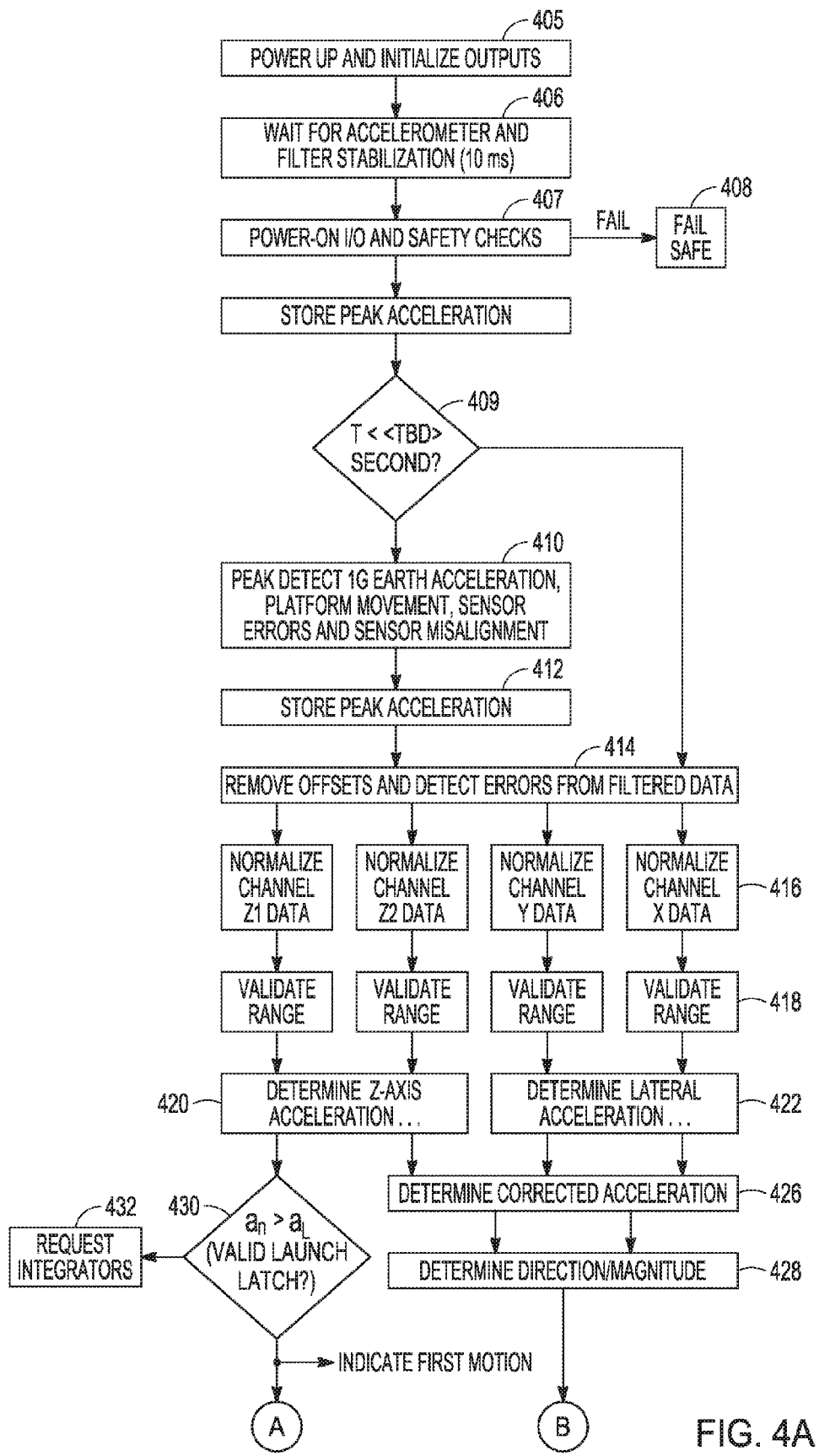
FIGS. 4A and 4B are a block diagram of a system and process to analyze motion of a vehicle.
Figure 4B:
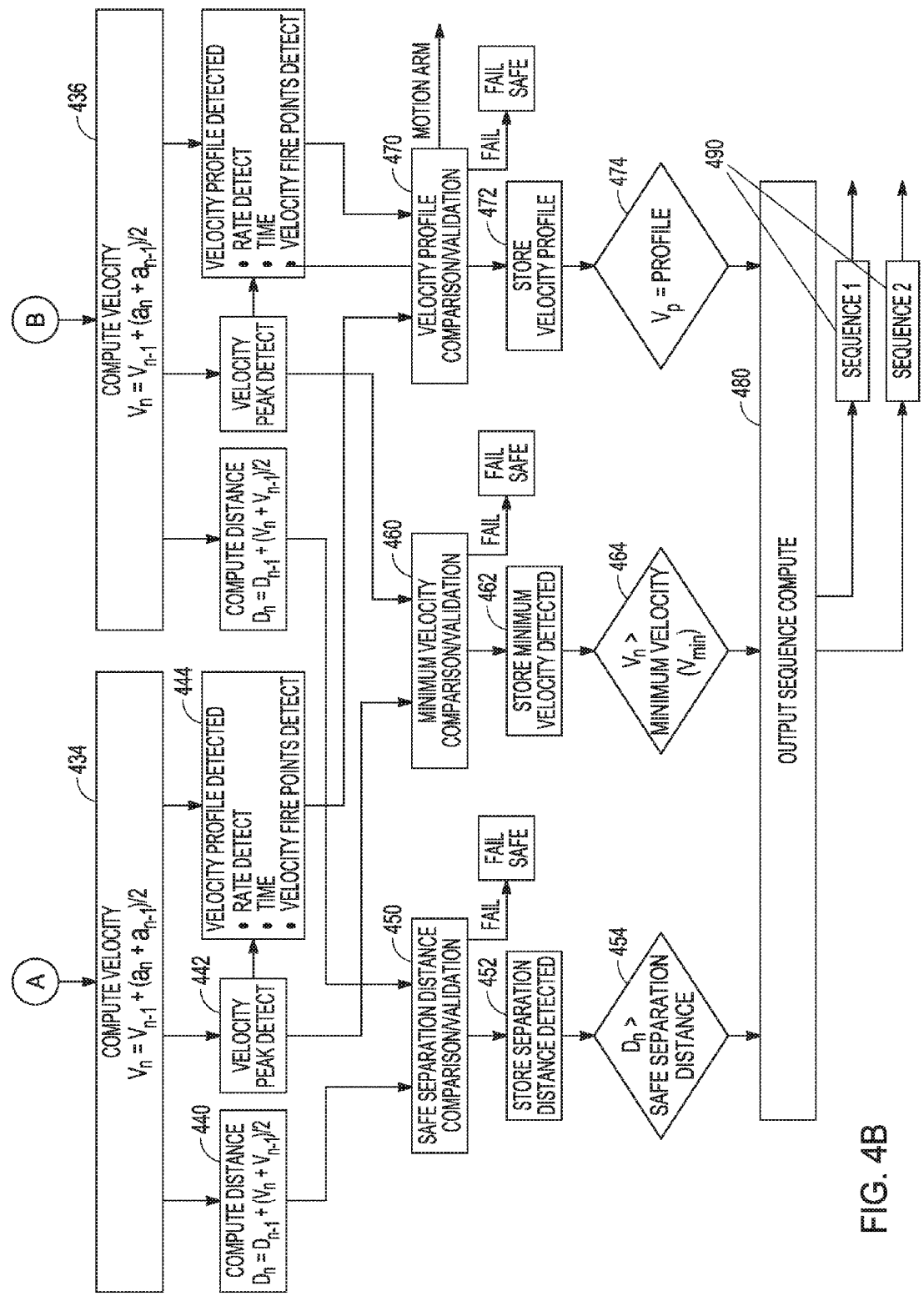

FIGS. 4A-4B are a block diagram illustrating an example method and system of analyzing a motion of a vehicle. FIGS. 4A-4B include a number of process blocks 405-490. Though arranged somewhat serially in the example of FIGS. 4A-4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 4A and 4B, in an embodiment, a motion analysis system for a vehicle and/or rocket, wherein the motion analysis system includes a first longitudinal accelerometer, a second longitudinal accelerometer, a first lateral accelerometer, a second lateral accelerometer, and a computer processor, executes a plurality of the following operations. At 405, the system is powered up and outputs are initialized. Acceleration sensor outputs are unpredictable at power on and need to be verified by the measurement system before they are used. A delay is inserted to allow them to stabilize and then the initial measurements are verified to an expected range at initialization before they are used for measurements. If the acceleration sensor does not respond according to expectations, the entire subsystem will enter the failsafe mode. At 406, the system executes a delay until the first longitudinal accelerometer, the second longitudinal accelerometer, the first lateral accelerometer, the second lateral accelerometer, and a filter stabilize. In an embodiment, at 407A, the filter is a 500 Hz low pass filter that is selected to minimize the internal clock rate and energy consumption, but to sample fast enough to capture key features in the profile. At 407, the system is powered on and safety checks are executed. Such safety checks can include verifying that the power on and reset have initialized critical registers, that system clocks have been checked and verified, and that intelligible data have been received from the accelerometers. If any problems are detected, the system enters a fail-safe mode at 408.

At 409, the system delays for a predetermined amount of time, for example 30 seconds. The delay required is to balance between the characteristic movement of the platform and the time allowed in the mission timeline to determine any effects of any detected errors. At 410, the system independently minimizes errors associated with a channel associated with each of the first longitudinal accelerometer, the second longitudinal accelerometer, the first lateral accelerometer, and the second lateral accelerometer. The system minimizes these errors by detecting and removing fixed offsets. For example, the system detects the acceleration of the earth, launch platform movement, sensor errors, and sensor misalignment. Regarding the sensor misalignment, the longitudinal and lateral accelerometers should be orthogonal to each other, and the two lateral accelerometers should be orthogonal to the longitudinal accelerometer. At 412, a peak acceleration is stored. The peak acceleration is measured by sensing a rise in the acceleration consistent with the expected profile and a series of samples of decreasing values. The maximum measured value is stored until it is replaced by a higher peak value. At

414, any detected offsets and errors are removed from the filtered data (407A). Operations 409 through 414 can be referred to as channel compensation operations.

At 416, the system normalizes data received from the first longitudinal accelerometer, the second longitudinal accelerometer, the first lateral accelerometer, and the second lateral accelerometer. The normalization is executed in order to account for the differences in the different individual accelerometers, which could include differences resulting from the use of different accelerometers from different manufacturers. The data from the accelerometers are independently scaled so that the resolution of the data matches and the data can be combined to create a corrected acceleration. At 418, the system verifies that the normalized data are within a range for subsequent calculations and that the normalized data track across the first longitudinal accelerometer, the second longitudinal accelerometer, the first lateral accelerometer, and the second lateral accelerometer. Operations 416 and 418 can be referred to as independent channel processing.

Figure 3:
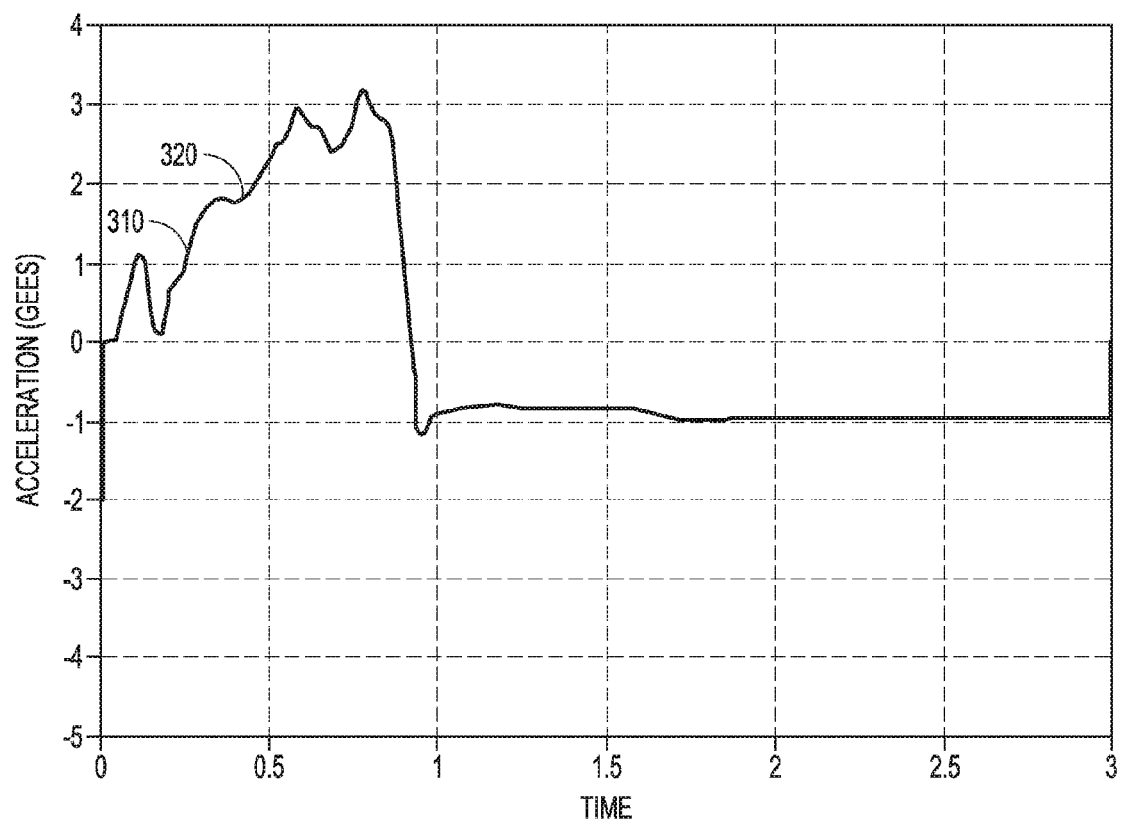
FIG. 3 is a diagram of an acceleration profile.

Operations 420 through 444 combine and correlate data from the longitudinal accelerometers, combine and correlate data from the lateral accelerometers, correct the data from the longitudinal and lateral accelerometers, and determine the velocity of and distance traveled by the vehicle, which can also be referred to as a velocity and distance integration. The system combines the longitudinal accelerometer data into a magnitude, and combines the lateral accelerometer data to create a single lateral acceleration magnitude and direction for a determination and evaluation of cross-flow experienced by the vehicle. Specifically, beginning at operation 420, the system uses the data from the first longitudinal accelerometer and the second longitudinal accelerometer to determine a longitudinal acceleration. At 430, the system determines if a first acceleration is greater than a second acceleration. Referring to FIG. 3, the first acceleration is identified by 310, and the second acceleration is defined by 320. If the first acceleration is greater than the second acceleration, then the system has determined, based on the longitudinal acceleration, that an initial motion of the vehicle has commenced. Due to the accuracy and the safety requirements, two dissimilar accelerometers are used (different manufactures and different ranges) to mitigate common mode failures. The accelerometers are expected to track within a small error up to the peak of the smaller range accelerometer. In the event of a peak outside the range of the accelerometer with the lower range, the higher range accelerometer will capture the peak values. The range of the expected profile plus a margin is to be matched as closely as possible with the smaller range accelerometer. Operation 430 is basically detecting a launch or an ejection. In an embodiment, the launch or ejection may be a multiple stage event that requires an initial acceleration profile evaluation over a short time period. If an initial acceleration has not been detected, then integrator circuits that determine the velocity and distance are reset at 432. At 434, the system computes a longitudinal velocity of the vehicle by adding to a previously-computed velocity an average of a current acceleration and a previously-measured acceleration. This can be referred to as a rectangular integration. At 440, the system computes a longitudinal distance of the vehicle by adding to a previously-computed distance an average of a current velocity and a previously-computed velocity. Also, at 442, the system detects a longitudinal peak velocity and at 444, the system detects a longitudinal velocity profile. The velocity along the longitudinal axis (or what may also be referred to as the Z-Axis) is the integration of the combination of the two longitudinal accelerometers.

Beginning at 426, the system uses data from the first longitudinal accelerometer, the second longitudinal accelerometer, the first lateral accelerometer, and the second lateral accelerometer to determine a corrected longitudinal-lateral acceleration, and at 428, to determine a longitudinal-lateral direction. The combined direction is simplified. Upon initialization a positive direction is assumed for the X-Y sensors as their orientation to the platform is not known. The assumed direction is consistent with the sensor positive output. From this the direction may be segmented into quadrants (X+/Y+, X+/Y−, X−/Y+, Y−/Y−). The direction within each quadrant may be coarsely determined by the ratio of the X and Y magnitudes. Once determined a similar operation may be accomplished by combining the lateral direction with the longitudinal direction. Operations 426 and 428 basically combine data from the longitudinal accelerometers and data from the lateral accelerometers to create an approximated direction and magnitude of the vehicle. Given the measured acceleration, the velocity and distance are determined. At 436, the system computes a longitudinal-lateral velocity by adding to a previously-computed longitudinal-lateral velocity an average of a current longitudinal-lateral acceleration and a previously-measured longitudinal-lateral acceleration. At 440A, the system computes a longitudinal-lateral distance by adding to a previously-computed longitudinal-lateral distance an average of a current longitudinal-lateral velocity and a previously-computed longitudinal-lateral velocity. At 442A, the system detects a longitudinal-latitude peak velocity, and at 444A, the system detects a longitudinal-latitude velocity profile.

Operations 450-474 can be referred to a channel checks. At 450, the system uses the computed longitudinal distance and the computed longitudinal-lateral distance to determine if a distance traveled by the vehicle is greater than a safe separation distance. A safe separation distance is a minimum distance that a vehicle has traveled away from the launch platform before an ejection, a second stage ignition, or other function can be initiated. Specifically, double integration from the corrected acceleration is used to determine the distance from the launch platform. As noted at 450A, if the vehicle/rocket has not attained a safe separation distance, the system goes into a fail-safe mode. At 452 and 454, if a safe separation distance has been detected, that is noted by the system.

At 460, the system uses the detected longitudinal peak velocity and the detected longitudinal-lateral peak velocity to determine if the vehicle has attained a minimum velocity. In addition to verifying that the vehicle has attained a safe separation distance, it is important to verify that the vehicle has attained a minimum velocity. The minimum velocity is calculated to enable functions that can only be successful if the object is moving above some minimum to discern the initial direction in order to be able to determine initial conditions. At 462 and 464, if a minimum velocity has been detected, that is noted by the system.

At 470, the system validates the longitudinal velocity profile and the longitudinal-lateral velocity profile. Profiles consist of, but are not limited to, an acceleration rate, one or more minimum acceleration peaks, an acceleration time, and an acceleration decay. These allow the system to discriminate an acceleration that has come from a functional propulsion system from one that is not functioning properly or from a periodic shock that may excite the system.

At 480, after the qualifications of operations 454, 464, and 474 have been satisfied, the system initiates an action for the vehicle. That is, when the distance traveled by the vehicle is greater than a safe separation distance, the peak velocity is greater than a minimum velocity threshold, and a position of the vehicle has been verified and profile data have been confirmed, the vehicular action is initiated.

EXAMPLE EMBODIMENTS

Example No. 1 is a motion analysis system that includes an acceleration measuring device and an acceleration processor operable to detect an initial motion of a vehicle (thereby establishing a baseline); a velocity processor operable to calculate a velocity of the vehicle by adding to a previously-computed velocity an average of a current acceleration and a previously-measured acceleration; a distance processor operable to calculate a distance traveled by the vehicle by adding to a previously-computed distance an average of a current velocity and a previously-computed velocity; a peak velocity processor operable to determine a peak velocity; a profile correlation processor coupled to a motion profile database, operable to verify a position of the vehicle and to confirm profile data (looking for vehicle to be at certain places at certain times; precise confirmation of profile data); and a vehicle action processor operable to determine a time for an initiation of an action for the vehicle by determining that the distance traveled by the vehicle is greater than a safe separation distance and that the peak velocity is greater than a minimum velocity threshold (e.g., rocket motor cut off deceleration; reduction in acceleration); wherein the system is configured to initiate the action for the vehicle based on the verified position of the vehicle and the confirmed profile data as determined by the profile correlation processor, and based on the determination that the distance traveled by the vehicle is greater than the safe separation distance and that the peak velocity is greater than the minimum velocity as determined by the vehicle action processor.

Example No. 2 includes the features of Example No. 1, and optionally includes a system wherein the acceleration measuring device includes first and second longitudinal acceleration measuring devices and first and second lateral acceleration measuring devices, wherein the first and second longitudinal acceleration measuring devices and the first and second lateral acceleration measuring devices are configured to provide acceleration data to the acceleration processor.

Example No. 3 includes the features of Example Nos. 1-2, and optionally includes a system wherein the acceleration processor is configured to combine data from the first and second longitudinal acceleration measuring devices, correlate the data from the first and second longitudinal acceleration measuring devices, determine if the initial motion has occurred by examining the combined and correlated data from the first and second longitudinal acceleration measuring devices, and determine a longitudinal velocity, a longitudinal distance, a longitudinal peak velocity, and a longitudinal velocity profile detection based on the combined and correlated data from the first and second longitudinal acceleration measuring devices.

Example No. 4 includes the features of Example Nos. 1-3, and optionally includes a system wherein the acceleration processor is configured to combine and correlate data from the first and second longitudinal acceleration measuring devices and data from the first and second lateral acceleration measuring devices and determine a corrected acceleration of the vehicle, a direction of the vehicle, and a velocity of the vehicle, and determine a longitudinal-lateral velocity, a longitudinal-lateral distance, a longitudinal-lateral peak velocity, and a longitudinal-lateral velocity profile detection based on the combined and correlated data from the first and second longitudinal acceleration measuring devices and the first and second lateral acceleration measuring devices.

Example No. 5 includes the features of Example Nos. 1-4, and optionally includes a system configured to verify that the longitudinal velocity is not greater than the longitudinal-lateral velocity and that the longitudinal distance is not greater than the longitudinal-lateral distance, and configured to enter a fail-safe mode when the longitudinal velocity is greater than the longitudinal-lateral velocity or when the longitudinal distance is greater than the longitudinal-lateral distance.

Example No. 6 includes the features of Example Nos. 1-5, and optionally includes a system configured to normalize data from the first and second longitudinal acceleration measuring devices and the first and second lateral acceleration measuring devices, and a system configured to validate data ranges from the first and second longitudinal acceleration measuring devices and the first and second lateral acceleration measuring devices.

Example No. 7 includes the features of Example Nos. 1-6, and optionally includes a system wherein the initiation of the action for the vehicle comprises a firing of the vehicle, a stage separation of the vehicle, a destruction of the vehicle, or a vehicle warhead function.

Example No. 8 includes the features of Example Nos. 1-7, and optionally includes a system including an anti-fuse field programmable gate array (FPGA) or an application specific integrated circuit (ASIC) coupled to the acceleration measuring device, wherein the anti-fuse FPGA or the ASIC includes the acceleration processor, the velocity processor, the distance processor, the peak velocity processor, the profile correlation processor, and the vehicle action processor.

Example No. 9 includes the features of Example Nos. 1-8, and optionally includes a system wherein the acceleration processor, the velocity processor, the distance processor, the peak velocity processor, the profile correlation processor, and the vehicle action processor include independent processors, circuits, or subsystems.

Example No. 10 includes the features of Example Nos. 1-9, and optionally includes a system wherein the acceleration processor is operable to detect an initial launch (e.g., a separation/ejection from another body) acceleration and is operable to latch (i.e., detect a crossing of an acceleration threshold, for example because of motor burnout or a reduced acceleration).

Example No. 11 includes the features of Example Nos. 1-10, and optionally includes a system wherein the profile correlation processor is operable to execute a motor/vehicle profile verification via correlation with an expected motor profile.

Example No. 12 includes the features of Example Nos. 1-11, and optionally includes a system wherein the acceleration processor is operable to sense acceleration of complex profiles in order to make ejection or launch decisions. Profiles such as previously described may also include large expected or unexpected acceleration features that with appropriate rules will dictate the response.

Example No. 13 includes the features of Example Nos. 1-12, and optionally includes a system operable to enter a fail-safe mode when the distance traveled by the vehicle is less than a safe separation distance; wherein double integration is used to calculate the distance.

Example No. 14 includes the features of Example Nos. 1-13, and optionally includes a system wherein the acceleration measuring device is operable to establish a baseline by analyzing a platform movement, an acceleration measuring device error, and an acceleration measuring device misalignment.

Example No. 15 includes the features of Example Nos. 1-14, and optionally includes a system wherein the previously-measured velocity comprises a most recently previously-measured velocity, the previously-measured acceleration comprises a most recently previously-measured acceleration, and the recently computed distance comprises a most recently previously-computed distance; and wherein rectangular integration is used.

Example No. 16 includes the features of Example Nos. 1-15, and optionally includes a system wherein the distance processor comprises an enable circuit and a measurement circuit.

Example No. 17 includes the features of Example Nos. 1-16, and optionally includes a system wherein calculation of the velocity by the velocity processor comprises an integration of the acceleration.

Example No. 18 includes the features of Example Nos. 1-17, and optionally includes a system wherein calculation of the distance by the distance processor comprises an integration of the velocity.

Example No. 19 includes the features of Example Nos. 1-18, and optionally includes a system wherein the safe separation distance is computed to an accuracy of approximately 0.3 meters.

Example No. 20 includes the features of Example Nos. 1-19, and optionally includes a system wherein the acceleration measuring device includes a first z-axis sensor, a second z-axis sensor, an x axis sensor, and a y axis sensor, and each axis of the acceleration measuring device is processed separately.

Example No. 21 includes the features of Example Nos. 1-20, and optionally includes a system wherein the acceleration measuring device comprises an accelerometer.

Example No. 22 includes the features of Example Nos. 1-21, and optionally includes a system including a validation processor coupled to one or more of the acceleration processor, the velocity processor, the distance processor, the peak velocity processor, the profile correlation processor, and the vehicle action processor; wherein the validation processor is operable to monitor one or more of the acceleration processor, the velocity processor, the distance processor, the peak velocity processor, the profile correlation processor, and the vehicle action processor for proper operation and error detection. As described above, margins are defined for particular application in order to qualify an energetic event or stimulus.

Example No. 23 includes the features of Example Nos. 1-22, and optionally includes a system wherein the validation processor is operable to place the system into a fail-safe state when an error is detected.

Example No. 24 includes the features of Example Nos. 1-23, and optionally includes a system including a timer processor operable to determine one or more check points or wait periods (e.g., waiting to detect an action, verifying an action).

Example No. 25 is a motion analysis system for a vehicle including a first longitudinal accelerometer and a second longitudinal accelerometer; a first lateral accelerometer and a second lateral accelerometer; and a computer processor coupled to the first longitudinal accelerometer, the second longitudinal accelerometer, the first lateral accelerometer, and the second lateral accelerometer; wherein the computer processor is configured to execute a delay until the first longitudinal accelerometer, the second longitudinal accelerometer, the first lateral accelerometer, the second lateral accelerometer, and a filter stabilize; independently minimize error associated with each of the first longitudinal accelerometer, the second longitudinal accelerometer, the first lateral accelerometer, and the second lateral accelerometer by detecting and removing fixed offsets; normalize data received from the first longitudinal accelerometer, the second longitudinal accelerometer, the first lateral accelerometer, and the second lateral accelerometer; verify that the normalized data are within a range for subsequent calculations and that the normalized data track across the first longitudinal accelerometer, the second longitudinal accelerometer, the first lateral accelerometer, and the second lateral accelerometer; use data from the first longitudinal accelerometer and the second longitudinal accelerometer to: determine a longitudinal acceleration; determine an initial motion of the vehicle based on the longitudinal acceleration; compute a longitudinal velocity of the vehicle by adding to a previously-computed velocity an average of a current acceleration and a previously-measured acceleration; compute a longitudinal distance of the vehicle by adding to a previously-computed distance an average of a current velocity and a previously-computed velocity; detect a longitudinal peak velocity; and detect a longitudinal velocity profile; use data from the first longitudinal accelerometer, the second longitudinal accelerometer, the first lateral accelerometer, and the second lateral accelerometer to: determine a corrected longitudinal-lateral acceleration; determine a longitudinal-lateral direction; determine a longitudinal-lateral distance; compute a longitudinal-lateral velocity by adding to a previously-computed longitudinal-lateral velocity an average of a current longitudinal-lateral acceleration and a previously-measured longitudinal-lateral acceleration; compute a longitudinal-lateral distance by adding to a previously-computed longitudinal-lateral distance an average of a current longitudinal-lateral velocity and a previously-computed longitudinal-lateral velocity; detect a longitudinal-latitude peak velocity; and detect a longitudinal-latitude velocity profile; use the computed longitudinal distance and the computed longitudinal-lateral distance to determine if a distance traveled by the vehicle is greater than a safe separation distance; use the detected longitudinal peak velocity and the detected longitudinal-lateral peak velocity to determine if the vehicle has attained a minimum velocity; validate the longitudinal velocity profile and the longitudinal-lateral velocity profile; and initiate an action for the vehicle when a distance traveled by the vehicle is greater than a safe separation distance, the peak velocity is greater than a minimum velocity threshold, and a position of the vehicle has been verified and profile data has been confirmed.

Example No. 26 includes the features of Example No. 25, and optionally includes a system wherein the computer processor, during the delay, verifies that one or more registers are initialized, verifies one or more clocks, and verifies that intelligible data are received from one or more sensors; and wherein the computer processor is configured to execute a second delay to measure one or more errors.

Example No. 27 includes the features of Example No. 25-26, and optionally includes a system wherein the detection of fixed offsets comprises detecting acceleration due to acceleration of the earth, an acceleration of a platform associated with the vehicle, (misalignment) errors associated with one or more of the first longitudinal accelerometer, the second longitudinal accelerometer, the first lateral accelerometer, and the second lateral accelerometer.

Example No. 28 includes the features of Example No. 25-27, and optionally includes a system wherein the initial motion is determined by verifying that a first acceleration is greater than a second acceleration.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A motion analysis system comprising:
    an acceleration measuring device and an acceleration processor operable to detect an initial motion of a vehicle;
    a velocity processor operable to calculate a velocity of the vehicle by adding to a previously-computed velocity an average of a current acceleration and a previously-measured acceleration;
    a distance processor operable to calculate a distance traveled by the vehicle by adding to a previously-computed distance an average of a current velocity and a previously-computed velocity;
    a peak velocity processor operable to determine a peak velocity;
    a profile correlation processor coupled to a motion profile database, operable to verify a position of the vehicle and to confirm profile data; and
    a vehicle action processor operable to determine a time for an initiation of an action for the vehicle by determining that the distance traveled by the vehicle is greater than a safe separation distance and that the peak velocity is greater than a minimum velocity threshold;
    wherein the system is configured to initiate the action for the vehicle based on the verified position of the vehicle and the confirmed profile data as determined by the profile correlation processor, and based on the determination that the distance traveled by the vehicle is greater than the safe separation distance and that the peak velocity is greater than the minimum velocity as determined by the vehicle action processor.

2. The motion analysis system of claim 1, wherein the acceleration measuring device comprises first and second longitudinal acceleration measuring devices and first and second lateral acceleration measuring devices, wherein the first and second longitudinal acceleration measuring devices and the first and second lateral acceleration measuring devices are configured to provide acceleration data to the acceleration processor.

3. The motion analysis system of claim 2, wherein the acceleration processor is configured to combine data from the first and second longitudinal acceleration measuring devices, correlate the data from the first and second longitudinal acceleration measuring devices, determine if the initial motion has occurred by examining the combined and correlated data from the first and second longitudinal acceleration measuring devices, and determine a longitudinal velocity, a longitudinal distance, a longitudinal peak velocity, and a longitudinal velocity profile detection based on the combined and correlated data from the first and second longitudinal acceleration measuring devices.

4. The motion analysis system of claim 2, wherein the acceleration processor is configured to combine and correlate data from the first and second longitudinal acceleration measuring devices and data from the first and second lateral acceleration measuring devices and determine a corrected acceleration of the vehicle, a direction of the vehicle, and a velocity of the vehicle, and determine a longitudinal-lateral velocity, a longitudinal-lateral distance, a longitudinal-lateral peak velocity, and a longitudinal-lateral velocity profile detection based on the combined and correlated data from the first and second longitudinal acceleration measuring devices and the first and second lateral acceleration measuring devices.

5. The motion analysis system of claim 3 or 4, wherein the system is configured to verify that the longitudinal velocity is not greater than the longitudinal-lateral velocity and that the longitudinal distance is not greater than the longitudinal-lateral distance, and the system is configured to enter a fail-safe mode when the longitudinal velocity is greater than the longitudinal-lateral velocity or when the longitudinal distance is greater than the longitudinal-lateral distance.

6. The motion analysis system of claim 2, wherein the system is configured to normalize data from the first and second longitudinal acceleration measuring devices and the first and second lateral acceleration measuring devices, and the system is configured to validate data ranges from the first and second longitudinal acceleration measuring devices and the first and second lateral acceleration measuring devices.

7. The motion analysis system of claim 1, wherein the acceleration processor is operable to detect an initial launch acceleration and is operable to detect a crossing of an acceleration threshold.

8. The motion analysis system of claim 1, wherein the profile correlation processor is operable to execute a motor profile verification via correlation with an expected motor profile.

9. The motion analysis system of claim 1, wherein the acceleration processor is operable to sense acceleration of complex profiles in order to make eject or launch decisions.

10. The motion analysis system of claim 1, wherein the motion analysis system is operable to enter a fail-safe mode when the distance traveled by the vehicle is less than a safe separation distance.

11. The motion analysis system of claim 1, wherein the acceleration measuring device is operable to establish a baseline by analyzing a platform movement, an acceleration measuring device error, and an acceleration measuring device misalignment.

12. The motion analysis system of claim 1, wherein the safe separation distance is computed to an accuracy of approximately 0.3 meters.

13. The motion analysis system of claim 1, wherein the acceleration measuring device comprises a first z-axis sensor, a second z-axis sensor, an x axis sensor, and a y axis sensor, and each axis of the acceleration measuring device is processed separately.

14. The motion analysis system of claim 1, comprising a validation processor coupled to one or more of the acceleration processor, the velocity processor, the distance processor, the peak velocity processor, the profile correlation processor, and the vehicle action processor; wherein the validation processor is operable to monitor one or more of the acceleration processor, the velocity processor, the distance processor, the peak velocity processor, the profile correlation processor, and the vehicle action processor for proper operation and error detection.

15. The motion analysis system of claim 1, comprising a timer processor operable to determine one or more check points or wait periods.

16. A motion analysis system for a vehicle comprising:
 a first longitudinal accelerometer and a second longitudinal accelerometer;
 a first lateral accelerometer and a second lateral accelerometer; and
 a computer processor coupled to the first longitudinal accelerometer, the second longitudinal accelerometer, the first lateral accelerometer, and the second lateral accelerometer;
 wherein the computer processor is configured to:
  execute a delay until the first longitudinal accelerometer, the second longitudinal accelerometer, the first lateral accelerometer, the second lateral accelerometer, and a filter stabilize;
  independently minimize error associated with each of the first longitudinal accelerometer, the second longitudinal accelerometer, the first lateral accelerometer, and the second lateral accelerometer by detecting and removing fixed offsets;
  normalize data received from the first longitudinal accelerometer, the second longitudinal accelerometer, the first lateral accelerometer, and the second lateral accelerometer;
  verify that the normalized data are within a range for subsequent calculations and that the normalized data track across the first longitudinal accelerometer, the second longitudinal accelerometer, the first lateral accelerometer, and the second lateral accelerometer;
  use data from the first longitudinal accelerometer and the second longitudinal accelerometer to:
   determine a longitudinal acceleration;
   determine an initial motion of the vehicle based on the longitudinal acceleration;
   compute a longitudinal velocity of the vehicle by adding to a previously-computed velocity an average of a current acceleration and a previously-measured acceleration;
   compute a longitudinal distance of the vehicle by adding to a previously-computed distance an average of a current velocity and a previously-computed velocity;
   detect a longitudinal peak velocity; and
   detect a longitudinal velocity profile;
  use data from the first longitudinal accelerometer, the second longitudinal accelerometer, the first lateral accelerometer, and the second lateral accelerometer to:
   determine a corrected longitudinal-lateral acceleration;
   determine a longitudinal-lateral direction;
   determine a longitudinal-lateral distance;
   compute a longitudinal-lateral velocity by adding to a previously-computed longitudinal-lateral velocity an average of a current longitudinal-lateral acceleration and a previously-measured longitudinal-lateral acceleration;
   compute a longitudinal-lateral distance by adding to a previously-computed longitudinal-lateral distance an average of a current longitudinal-lateral velocity and a previously-computed longitudinal-lateral velocity;
   detect a longitudinal-latitude peak velocity; and
   detect a longitudinal-latitude velocity profile;
  use the computed longitudinal distance and the computed longitudinal-lateral distance to determine if a distance traveled by the vehicle is greater than a safe separation distance;
  use the detected longitudinal peak velocity and the detected longitudinal-lateral peak velocity to determine if the vehicle has attained a minimum velocity;
  validate the longitudinal velocity profile and the longitudinal-lateral velocity profile; and
  initiate an action for the vehicle when a distance traveled by the vehicle is greater than a safe separation distance, the peak velocity is greater than a minimum velocity threshold, and a position of the vehicle has been verified and profile data have been confirmed.

17. The motion analysis system of claim 16, wherein the computer processor, during the delay, verifies that one or more registers are initialized, verifies one or more clocks, and verifies that intelligible data are received from one or more sensors; and wherein the computer processor is configured to execute a second delay to measure one or more errors.

18. The motion analysis system of claim 16, wherein the detection of fixed offsets comprises detecting acceleration due to acceleration of the earth, an acceleration of a platform associated with the vehicle, and misalignment errors associated with one or more of the first longitudinal accelerometer, the second longitudinal accelerometer, the first lateral accelerometer, and the second lateral accelerometer.

19. The motion analysis system of claim 16, wherein the initial motion is determined by verifying that a second acceleration is greater than a first acceleration.

* * * * *

UNITED STATES PATENT AND TRADEMARK OFFICE
CERTIFICATE OF CORRECTION

PATENT NO.        : 9,846,011 B1
APPLICATION NO.   : 15/331157
DATED             : December 19, 2017
INVENTOR(S)       : Clark et al.

Page 1 of 1

It is certified that error appears in the above-identified patent and that said Letters Patent is hereby corrected as shown below:

In the Specification

In Column 3, Line 43, delete "general" and insert --general,-- therefor

In Column 4, Line 37, delete "407A," and insert --407,-- therefor

In Column 5, Line 2, delete "(407A)." and insert --(407).-- therefor

In Column 6, Line 26, delete "440A," and insert --440,-- therefor

In Column 6, Line 30, delete "442A," and insert --442,-- therefor

In Column 6, Line 31, delete "444A," and insert --444,-- therefor

In Column 6, Line 42, delete "450A," and insert --450,-- therefor

Signed and Sealed this
Twenty-eighth Day of May, 2019

Andrei Iancu
*Director of the United States Patent and Trademark Office*